(12) United States Patent
Kinoshita

(10) Patent No.: US 10,844,957 B2
(45) Date of Patent: Nov. 24, 2020

(54) GASKET

(71) Applicant: Ishikawa Gasket Co., Ltd., Tokyo (JP)

(72) Inventor: Yuichi Kinoshita, Utsunomiya (JP)

(73) Assignee: ISHIKAWA GASKET CO., LTD., Tokyo (JP)

( * ) Notice: Subject to any disclaimer, the term of this patent is extended or adjusted under 35 U.S.C. 154(b) by 150 days.

(21) Appl. No.: 15/955,808

(22) Filed: Apr. 18, 2018

(65) Prior Publication Data

US 2019/0323605 A1    Oct. 24, 2019

(51) Int. Cl.
*F16J 15/08* (2006.01)
*F16J 15/30* (2006.01)
*F16J 15/12* (2006.01)

(52) U.S. Cl.
CPC ......... *F16J 15/0806* (2013.01); *F16J 15/121* (2013.01); *F16J 15/30* (2013.01)

(58) Field of Classification Search
CPC .... F16J 15/0812; F16J 15/0806; F16J 15/121; F16J 15/30
See application file for complete search history.

(56) References Cited

U.S. PATENT DOCUMENTS

| | | | | |
|---|---|---|---|---|
| 2,119,158 A * | 5/1938 | Frey | ..................... | F16J 15/0812 277/592 |
| 2,197,916 A * | 4/1940 | Balfe | ................... | F16J 15/0812 428/608 |
| 2,275,085 A * | 3/1942 | Michel | ................. | F16J 15/0812 428/591 |
| 3,737,169 A * | 6/1973 | Glynn | .................... | F16J 15/123 277/596 |
| 3,814,142 A * | 6/1974 | Barnett | .................. | D03D 25/00 139/420 C |
| 4,828,932 A * | 5/1989 | Morimoto | ................. | E04C 2/08 181/292 |
| 9,751,244 B2 * | 9/2017 | Dry | ........................ | B64D 37/32 |
| 2012/0328419 A1 * | 12/2012 | Riggi, Jr. | ............. | B23K 15/006 415/174.2 |
| 2014/0217683 A1 * | 8/2014 | Martinetto | ............. | F16J 15/121 277/654 |
| 2016/0017999 A1 * | 1/2016 | Boyd | ...................... | B29C 39/42 277/651 |
| 2016/0369436 A1 * | 12/2016 | Stewart | .................. | D04B 1/225 |

(Continued)

FOREIGN PATENT DOCUMENTS

| | | | | |
|---|---|---|---|---|
| JP | 07217745 A | * | 8/1995 | ............... D04C 1/02 |
| JP | 2001032936 A | * | 2/2001 | ............. C22C 37/08 |

(Continued)

*Primary Examiner* — Eugene G Byrd
(74) *Attorney, Agent, or Firm* — Manabu Kanesaka

(57) ABSTRACT

A gasket and a method for manufacturing thereof which can improve durability by maintaining a surface pressure over a long period of time is provided. A gasket is formed by a first annular portion including a sealing object hole formed by a metal wire weave wherein a metal wire is braided; and a main member portion contacting an outer circumferential edge of the first annular portion. A metal wire forming the first annular portion and a metal wire forming the main member portion are respectively interlaced, and a compressive stress in an x direction of the metal wire weave forming the first annular portion differs from a compressive stress in the x direction of the metal wire weave forming the main member portion.

7 Claims, 9 Drawing Sheets

(56) References Cited

U.S. PATENT DOCUMENTS

2017/0037970 A1* 2/2017 Schollhammer ....... F16J 15/064
2017/0051831 A1* 2/2017 Haley ................... F16J 15/028
2018/0306323 A1* 10/2018 Kinoshita ............ F16J 15/0818

FOREIGN PATENT DOCUMENTS

| | | |
|---|---|---|
| JP | 2013-221602 A | 10/2013 |
| JP | 2015-068405 A | 4/2015 |
| JP | 2015-132378 A | 7/2015 |
| JP | 2016-142242 A | 8/2016 |

\* cited by examiner $\rho 1 > \rho 2 > \rho 3$ $\rho 1 > \rho 2 > \rho 3$

GASKET

BACKGROUND OF THE INVENTION AND RELATED ART STATEMENT

The present invention relates to a gasket and a method for manufacturing thereof, and more specifically, relates to the gasket and the method for manufacturing thereof wherein durability is improved.

BACKGROUND ART

In a gasket wherein a surface pressure adjustment is necessary such as a gasket disposed between a cylinder head and a cylinder block, a gasket disposed between flanges of an exhaust pipe, and the like, there is used a gasket wherein a plurality of metal plates is laminated (for example, see Japanese Patent Application Publication No. 2016-142242). In such a gasket, a surface pressure is adjusted by forming beads or folding in the metal plates thereof.

PRIOR ART DOCUMENT

Patent Document

Patent Document 1: Japanese Unexamined Patent Application Publication No. 2016-142242

SUMMARY OF THE INVENTION

Problems to be Solved by the Invention

However, when the gasket is fastened over a long period of time, the formed beads or folded portions extend due to stress or thermal expansion to reduce a compressive stress. Therefore, in the gasket wherein the plurality of metal plates is laminated, there is a problem that it is difficult to maintain the surface pressure for a long period of time. This problem is especially notable in a gasket wherein a high-temperature exhaust gas is circulated such as an EGR gasket, a turbocharger gasket, and the like.

The present invention is made in view of the aforementioned problem, and an object of the present invention is to provide a gasket and a method for manufacturing thereof which can improve durability by maintaining the surface pressure over a long period of time.

Further objects and advantages of the invention will be apparent from the following description of the invention.

Means for Solving the Problems

In order to solve the aforementioned problem, a gasket of the present invention is formed by metal wire weave including at least one through hole, and comprising an annular portion including the through hole, and a main member portion contacting an outer circumferential edge of the annular portion. Also, the gasket is formed by respectively interlacing metal wire weave forming the annular portion and metal wire weave forming the main member portion, and a compressive stress in a thickness direction of the metal wire weave forming the annular portion differ from a compressive stress in a thickness direction of metal wire weave forming the main member portion.

In order to solve the aforementioned problem, a method for manufacturing the gasket of the present invention comprises weaving a cylindrical metal wire to form an annular portion, and crushing the annular portion in a pipe axis direction; weaving other cylindrical metal wire weave to form a main member portion by crushing the other cylindrical metal wire weave in a radial direction; widening a weaved portion apart at a predetermined position of the obtained main member portion; placing the annular portion in a hole formed by thus widened; and integrating the obtained main member portion and annular portion by crushing them further in the pipe axis direction of the annular portion.

Effect of the Invention

According to the present invention, the respective metal wire weave of the annular portion and the main member portion formed by the metal wire weave interlace so as to become a plate shape, and a compressive stress of the annular portion differs from a compressive stress of the main member portion to freely adjust a surface pressure between the annular portion and the main member portion. Thereby, even if the gasket is fastened over a long period of time, the gasket of the present invention becomes advantageous for maintaining the surface pressure compared to a conventional gasket wherein a plurality of metal plates is laminated so as to improve durability.

BRIEF DESCRIPTION OF THE DRAWINGS

FIGS. 3(a), 3(b), and 3(c) show portions formed by a method for manufacturing the gasket in FIG. 1 as an example, wherein FIGS. 3(a) to 3(c) are respectively structural views showing metal wire weave forming a first annular portion, a second annular portion, and a main member portion;

FIGS. 4(a) and 4(b) show portions formed by the method for manufacturing the gasket in FIG. 1 as an example, wherein FIG. 4(a) is a perspective view showing the main member portion, and FIG. 4(b) is a perspective view showing a state wherein the first annular portion and the second annular portion are placed in the main member portion;

DETAILED DESCRIPTION OF PREFERRED EMBODIMENTS

Figure 1:
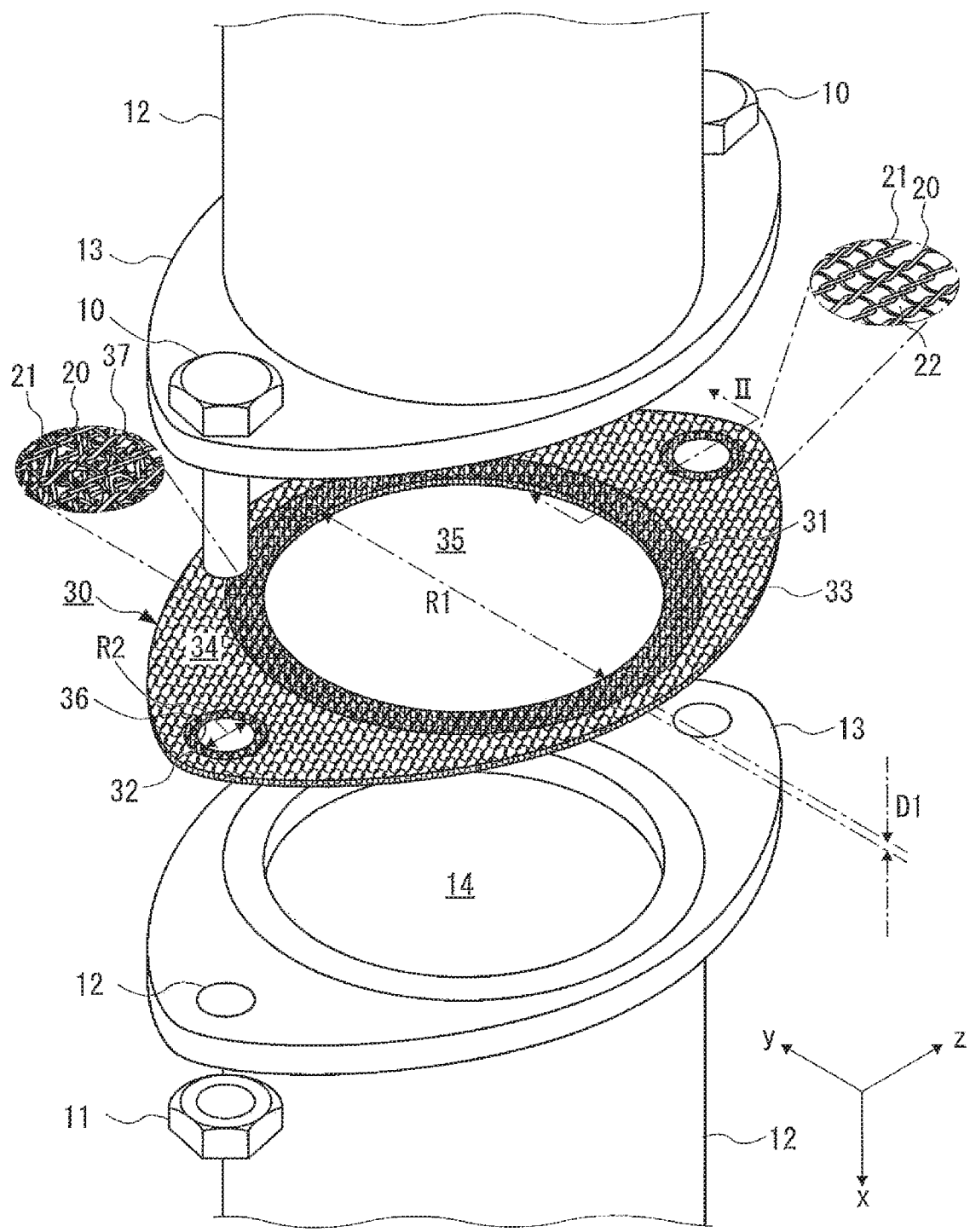
FIG. 1 is a perspective view showing the first embodiment of a gasket as an example according to the present invention.

Hereinafter, embodiments of the present invention will be explained with reference to the drawings. In the drawings, the reference alphabet x represents a thickness direction, and the reference alphabets y and z represent directions orthogonal to the x direction and orthogonal to each other. Incidentally, in FIG. 1 to FIG. 9(c), sizes are changed to easily understand a structure, and the sizes do not necessarily correspond to ratios of portions actually manufactured.

As shown in FIG. 1 as an example, a gasket 30 according to the first embodiment is a gasket for a flange fastened by bolts 10 and nuts 11 as fasteners, and disposed between flanges 13 of a pipe 12.

The gasket 30 comprises a first annular portion 31 and a second annular portion 32 formed by metal wire weave 21 wherein metal wire 20 are weaved; and a main member portion 33 formed by a metal wire weave 21 wherein the metal wire 20 is weaved likewise. In the gasket 30, the metal wire 20 respectively forming the first annular portion 31, the second annular portion 32, and the main member portion 33 interlace so as to be joined, and the gasket 30 includes plate faces 34 extending in a y to z plane surface on both ends in the x direction, and is formed in one sheet of a plate shape wherein a thickness D1 in the x direction is 0.4 mm to 2.0 mm.

The metal wire 20 is formed by a thin metallic thread with a diameter of 0.1 mm to 0.3 mm, and there is shown as an example a copper alloy wire for a spring such as a stainless steel wire represented by SUS301, SUS304, SUS304L, and the like, a brass, a phosphor bronze, a nickel silver, a beryllium copper ally, and the like. Each of the metal wire 20 of the embodiment is the same metal and has the same diameter.

The metal wire weave 21 is formed by weaving the metal wire 20 in such a way so as to continuously bind stitches (loops) 22. Specifically, the metal wire weave 21 is weaved by a weft knitting (a plain stitch, a rib stitch, and a pearl stitch) wherein the stitches 22 are pulled out in a direction orthogonal to an extending direction of the metal wire 20. A weaving method is not limited provided that the metal wire weave 21 is formed by weaving the metal wire 20, and the metal wire weave 21 may be weaved by a warp knitting (a tricot stick).

The first annular portion 31 includes a sealing object hole 35 passing through in the x direction, and is an annular member in a plan view in the x direction. The second annular portion 32 includes a fastener insertion hole 36 passing through in the x direction, and is an annular member in the plan view in the x direction.

The sealing object hole 35 is a through hole corresponding to a hole 14 through which a fluid in the pipe 12 passes. The fastener insertion hole 36 is disposed around the sealing object hole 35, and is a through hole through which the bolt 10 passes. A diameter R1 of the sealing object hole 35 is larger than a diameter R2 of the fastener insertion hole 36.

The first annular portion 31 includes a filling material 37. In the metal wire weave 21 forming the first annular portion 31, the stitches 22 are closed by the filling material 37. As for the filling material 37, a carbon is shown as an example. Incidentally, in the drawings, although the filling material 37 is shown by points, actually the stitches 22 are closed by the filling material 37. A state wherein the stitches 22 are closed is a state wherein the fluid does not pass through the stitches 22, and the first annular portion 31 is formed such that the fluid passing through the sealing object hole 35 does not leak to an outside in a circumferential direction of the first annular portion 31.

The main member portion 33 adjoins an outer circumferential edge of the first annular portion 31, and adjoins an outer circumferential edge of the second annular portion 32, and an outer circumferential shape of the main member portion 33 is formed in the same shape as an outer circumferential shape of the flange 13. The main member portion 33 includes one first placement hole 38 and two second placement holes 39.

The first placement hole 38 is formed at a center portion of the main member portion 33, and the first annular portion 31 is placed in such a way so as to contact an inner circumferential edge of the first placement hole 38. Two second placement holes 39 are formed at positions which become diagonal to each other around the first placement hole 38, and the second annular portion 32 is placed in such a way so as to contact an inner circumferential edge of the second placement hole 39.

Figure 2:
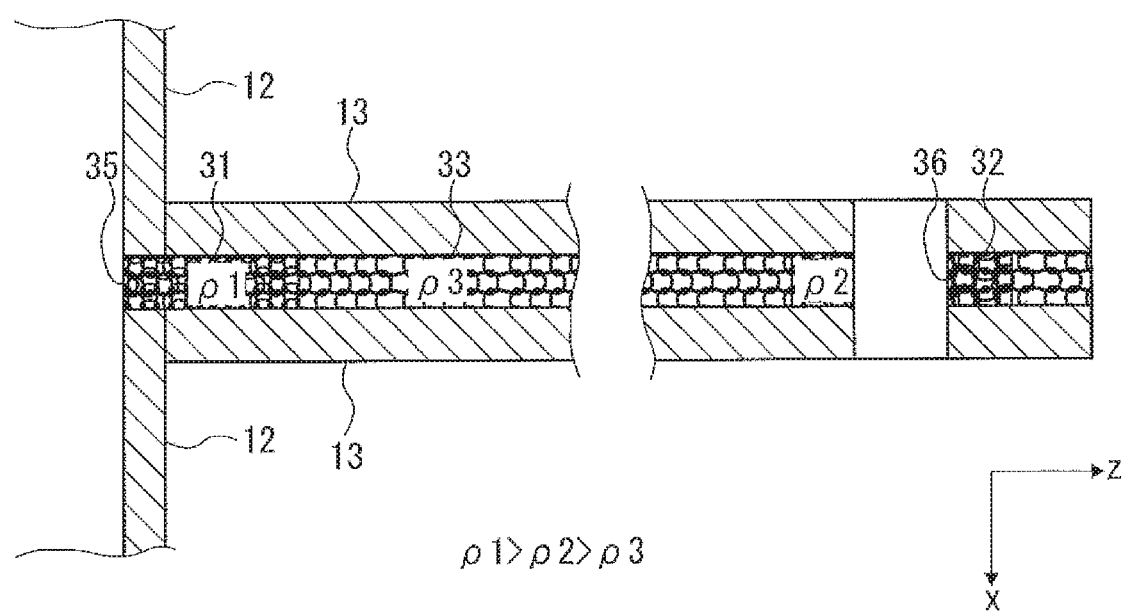
FIG. 2 is a cross-sectional view taken along an arrow II in FIG. 1.

As shown in FIG. 2 as an example, in the first annular portion 31, the second annular portion 32, and the main member portion 33, respectively, compressive stress in the x direction differs in a state wherein the gasket 30 is clamped between the flanges 13 of the pipe 12 and is fastened by the bolts 10 and the nuts 11.

The compressive stress generated respectively in the first annular portion 31, the second annular portion 32, and the main member portion 33 is generated when a clamping pressure (a fastening force) by the bolts 10 and the nuts 11 becomes a predetermined degree or above wherein the plate faces 34 settle into seat faces of the flanges 13 (the predetermined degree wherein both of the plate faces 34 contact the seat faces of the flanges 13 with no gap).

Specifically, in the embodiment, in the first annular portion 31, the second annular portion 32, and the main member portion 33, respectively, a volume density of the metal wire 20 forming the respective first annular portion 31, second annular portion 32, and main member portion 33 differs. Incidentally, the volume density is a mass per unit area.

The volume density of the metal wire 20 is reduced in the order of a volume density p1 of the metal wire 20 of the first annular portion 31, a volume density p2 of the metal wire 20 of the second annular portion 32, and a volume density p3 of the metal wire 20 of the main member portion 33, and the volume density p1 is the largest. Namely, the metal wire 20 becomes dense in the order of the main member portion 33, the second annular portion 32, and the first annular portion 31, and the first annular portion 31 becomes the densest. Namely, a surface pressure of the gasket 30 increases in the order of the main member portion 33, the second annular portion 32, and the first annular portion 31, and the first annular portion 31 becomes the highest surface pressure.

As shown in FIGS. 3(a), 3(b), and 3(c), and FIGS. 4(a) and 4(b) as an example, a method for manufacturing the gasket 30 is a method of forming the first annular portion 31 and the second annular portion 32 by a cylindrical metal wire weave 21 formed by weaving the metal wire 20; forming the main member portion 33 by the other cylindrical metal wire weave 21 formed by weaving the metal wire 20; and compressing the first annular portion 31, the second annular portion 32, and the main member portion 33 to form in a plate shape.

Figure 3A:
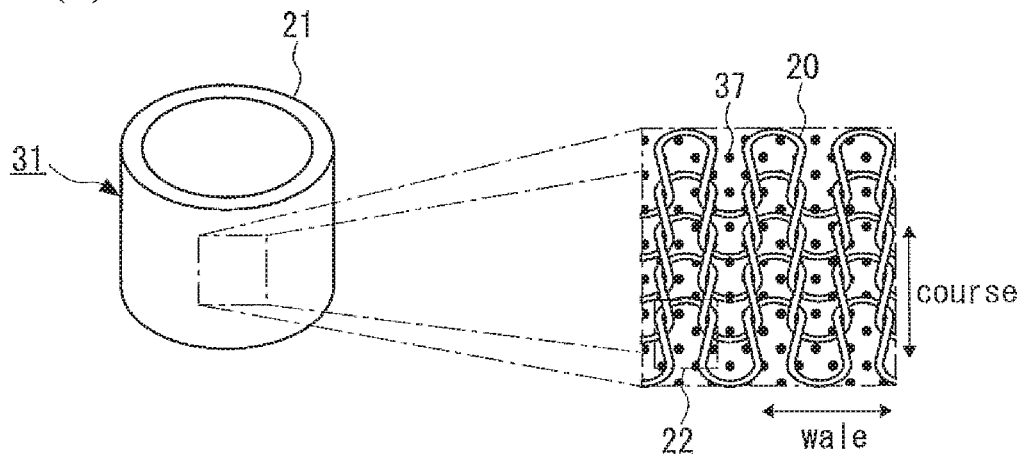
Figure 3B:
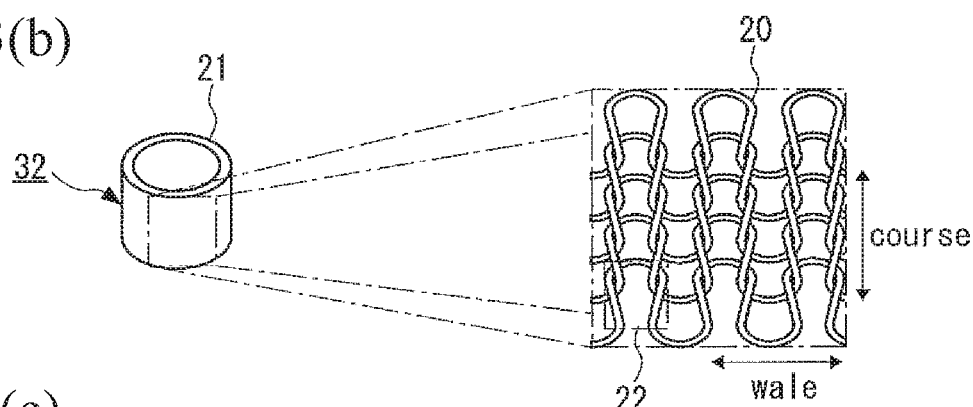
Figure 3C:
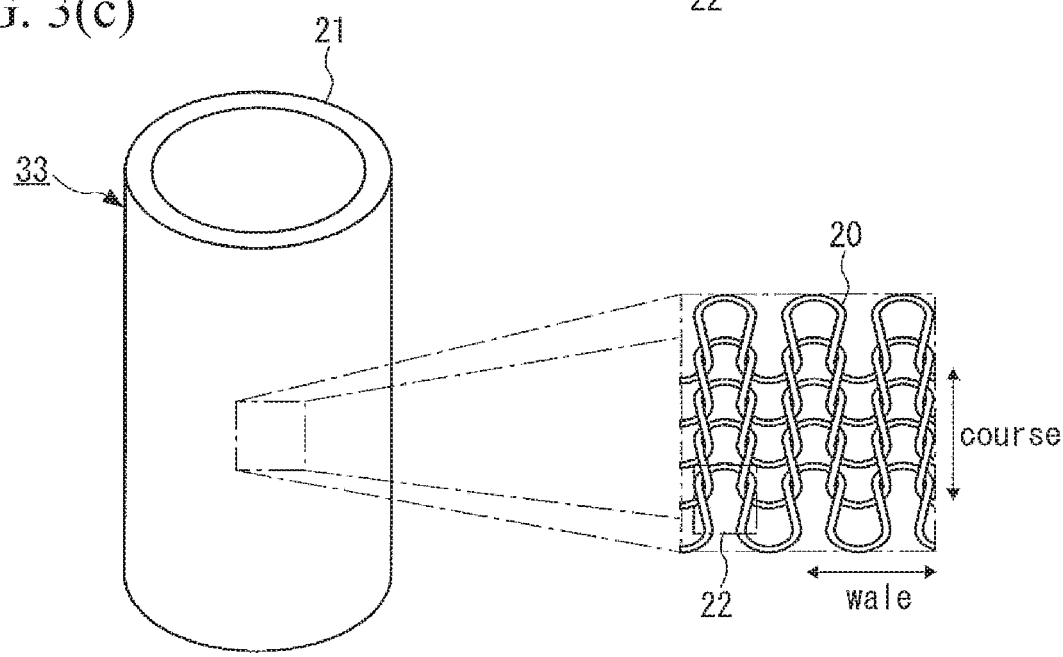

As shown in FIGS. 3(a) to 3(c) as an example, the metal wire 20 is weaved such that a course direction faces a cylindrical shaft direction, and a wale direction faces a cylindrical circumferential direction, respectively so as to form a plurality of cylindrical metal wire weave 21. In an example shown in the drawings, the plurality of cylindrical metal wire weave 21 is weaved by one weaving machine, so that the number of courses (horizontal rows) and the number of wales (vertical rows) of the metal wire weave 21 are limited to the same number. Incidentally, a composition (the number of the courses, the number of the wales, and the like) of the metal wire weave 21 can be changed by changing an interval of a pitch of the weaving machine and the like, and can be changed respectively in the first annular portion 31, the second annular portion 32, and the main member portion 33

Figure 4A:
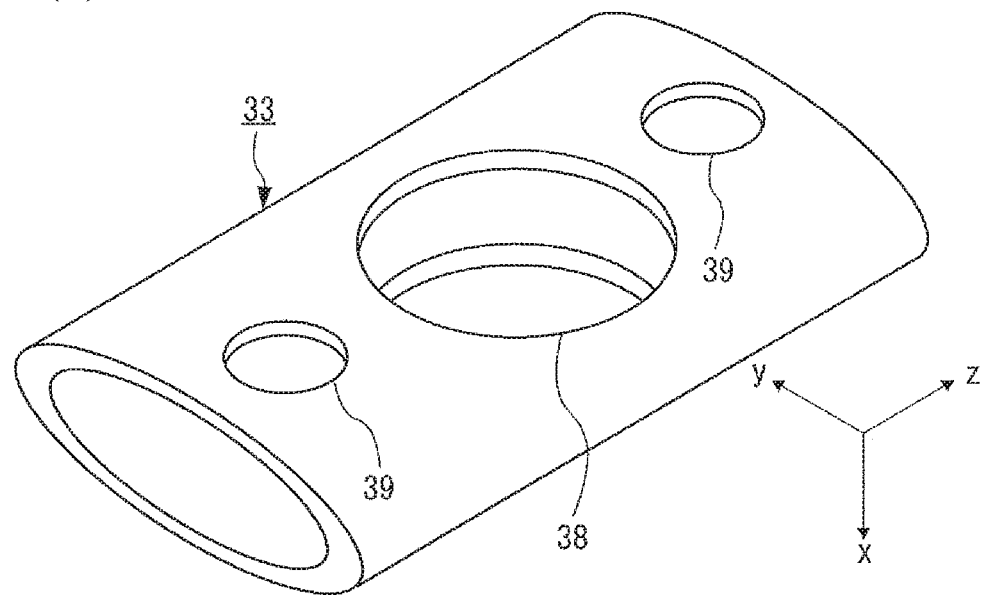

As shown in FIG. 4(a) as an example, the main member portion 33 is formed by one of the plurality of metal wire weave 21. Specifically, first, the metal wire weave 21 wherein the cylindrical shaft direction faces a z direction orthogonal to the x direction are crushed in a cylindrical radial direction in such a way so as to fold in the x direction. Next, the stitches 22 at predetermined positions of the metal wire weave 21 are spread apart on the y to z plane surface to form the first placement hole 38 and the second placement holes 39. The aforementioned predetermined positions are positions respectively corresponding to the first annular portion 31 and the second annular portion 32, and the first placement hole 38 is located at the center portion of the main member portion 33, and the second placement holes 39 are located at positions which become diagonal to each other around the first placement hole 38. Thus, when the metal wire weave 21 is crushed in the x direction, the metal wire weave 21 which becomes the main member portion 33 is formed.

In the embodiment, although the main member portion 33 is formed by one cylindrical metal wire weave 21, the main member portion 33 may be formed by the plurality of cylindrical metal wire weaves 21. Also, in the first placement hole 38 and the second placement holes 39, sizes and shapes thereof are not limited provided that the metal wire weave 21 of the first annular portion 31 and the metal wire weave 21 of the second annular portion 32 can be respectively placed inwardly. The first placement hole 38 and the second placement holes 39 may be formed by cutting out the main member portion 33; however, when the main member portion 33 is cut out, it easily loosens, so that it is preferable to form the first placement hole 38 and the second placement holes 39 by spreading the stitches 22 apart.

Figure 4B:
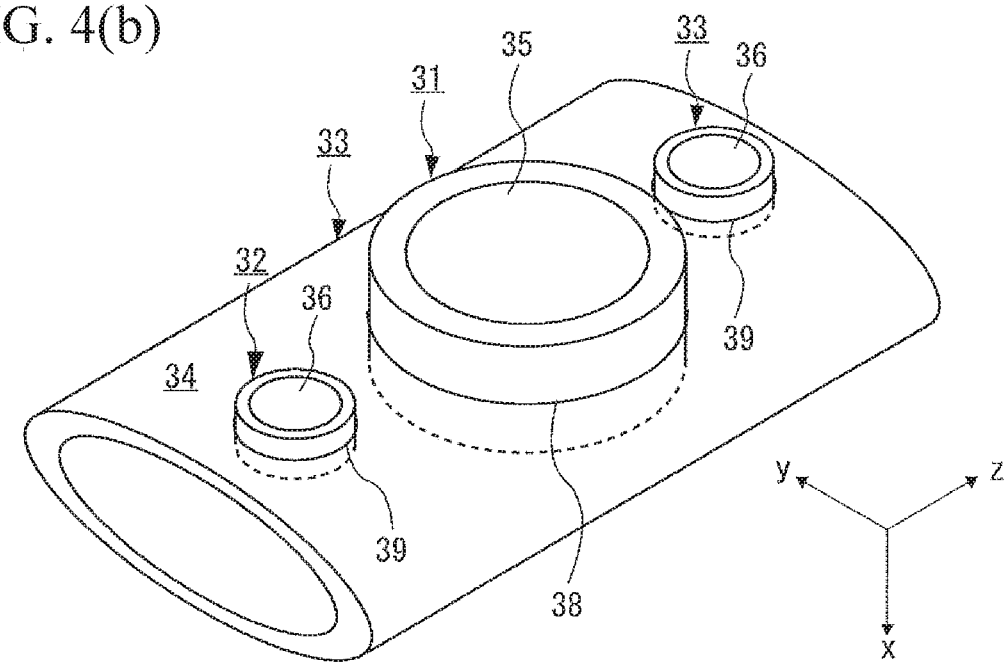

As shown in FIG. 4(b) as an example, the metal wire weave 21 of the first annular portion 31 is placed inside the first placement hole 38, and the metal wire weave 21 of the second annular portion 32 is placed inside the second placement holes 39 such that the cylindrical shaft direction respectively faces the x direction. At that time, a face of the metal wire weave 21 of the main member portion 33 and faces of the metal wire weave 21 of the first annular portion 31 and the metal wire weave 21 of the second annular portion 32 are orthogonal.

Incidentally, in the first annular portion 31 and the second annular portion 32, the shapes thereof may be respectively formed partially by crushing in a pipe axis direction before the first annular portion 31 and the second annular portion 32 are placed in the first placement hole 38 and the second placement holes 39 of the main member portion 33.

Thus, all of the combined metal wire weave 21 are compressed in the x direction using a press machine (not shown in the drawings), and the first annular portion 31, the second annular portion 32, and the main member portion 33 are formed in one sheet of the plate shape including the plate faces 34 on both ends in the x direction so as to complete the manufacturing method. Incidentally, according to a type of the press machine, the metal wire weave 21 are compressed in the x direction, and are compressed on the y to z plane surface, so that outer circumferential shapes of the sealing object hole 35 of the first annular portion 31, the fastener insertion hole 36 of the second annular portion 32, and the main member portion 33 may be formed.

When the first annular portion 31, the second annular portion 32, and the main member portion 33 are compressed, the metal wire 20 (the stitches 22) mutually intertwine (interlace) at respective boundaries so as to join with each other. Specifically, the respective stitches 22 between the outer circumferential edge of the first annular portion 31 and the inner circumferential edge of the first placement hole 38 of the main member portion 33 are intertwined so as to join the first annular portion 31 and the main member portion 33. Also, the respective stitches 22 between the outer circumferential edge of the second annular portion 32 and the inner circumferential edge of the second placement hole 39 are intertwined so as to join the second annular portion 32 and the main member portion 33.

Also, the filling material 37 may be filled in the first annular portion 31 before the first annular portion 31 is compressed in the x direction. For example, when a powder of the carbon is filled in the first annular portion 31 before compression, and the first annular portion 31 is compressed, the powder of the carbon is compressed as well in such a way so as to close the stitches 22.

Thus, the aforementioned gasket 30 becomes the plate shape by intertwining the respective metal wire 20 of the first annular portion 31, the second annular portion 32, and the main member portion 33 formed by the metal wire weaves 21, and the compressive stress of the first annular portion 31, the second annular portion 32, and the main member portion 33 can respectively differ. Therefore, when the flanges 13 are fastened, the respective surface pressures of the first annular portion 31, the second annular portion 32, and the main member portion 33 can be adjusted freely. Thereby, even if the gasket 30 is fastened over a long period of time, the gasket 30 becomes advantageous for maintaining the surface pressure so as to improve durability compared to a conventional gasket wherein a plurality of metal plates is laminated.

Especially, the aforementioned gasket 30 is suitable for an EGR gasket used for an EGR pipe of an engine, a turbocharger gasket used for a turbocharger. The gasket 30 seals a high-temperature exhaust gas, and even if the metal wire 20 extends due to thermal expansion, the gasket 30 can maintain the surface pressure compared to the conventional gasket wherein the plurality of metal plates is laminated.

Also, the gasket 30 is formed by the metal wire weaves 21 wherein the metal wires 20 are weaved so as to be reduced in weight compared to the conventional gasket wherein the plurality of metal plates is laminated. Thereby, the gasket 30 becomes advantageous for reducing the weight of the engine so as to improve fuel consumption of the engine.

Also, compared to the conventional gasket wherein the plurality of metal plates is laminated, a process of forming beads or folding in the respective metal plates can be omitted, so that the gasket 30 becomes advantageous for simplifying manufacturing so as to improve productivity.

In the gasket 30 of the embodiment, the stitches 22 of the metal wire weave 21 of the first annular portion 31 are closed by the filling material 37 so as to improve a seal performance while maintaining a degree of freedom of an adjustment of the surface pressure. Also, the filling material 37 may be filled only in the first annular portion 31 so as to be advantageous for reducing the weight of the gasket 30.

In the gasket 30 of the embodiment, the volume density of the metal wire 20 becomes smaller in the order of the first annular portion 31, the second annular portion 32, and the main member portion 33. Therefore, hardness as a whole of the gasket 30 can be lowered by the main member portion 33, so that even in a case wherein the fastening force by the bolts 10 and the nuts 11 is low, an insufficient fastening force can be prevented. On the other hand, hardness of a circumferential edge of the sealing object hole 35 wherein the seal performance is necessary can be increased by the first annular portion 31 so as to improve the seal performance.

In the gasket 30 of the embodiment, in a state wherein the cylindrical metal wire weave 21 in which the cylindrical shaft direction faces the x direction is compressed in the x direction, the first annular portion 31 and the second annular portion 32 form an annular shape viewed in the x direction.

Thus, in the first annular portion 31 and the second annular portion 32, the cylindrical metal wire weave 21 is compressed in the cylindrical shaft direction so as to easily form the sealing object hole 35 or the fastener insertion hole 36. Also, only by changing a length in the cylindrical shaft direction of the cylindrical metal wire weave 21 without changing the weaving method of the metal wire 20, the volume density of the metal wire 20 of the first annular portion 31 and the second annular portion 32 can be increased. Thereby, a manufacturing process can be simplified so as to be suitable for a mass production.

Also, the main member portion 33 is formed in the plate shape in a state wherein the cylindrical metal wire weave 21 in which the cylindrical shaft direction faces a direction orthogonal to the x direction is compressed in the x direction, and includes the first placement hole 38 and the second placement holes 39 formed by spreading the stitches 22 of the metal wire weave 21 thereof. Thereby, the main member portion 33 becomes advantageous for preventing the main member portion 33 from loosening so as to improve the durability furthermore.

Figure 5:
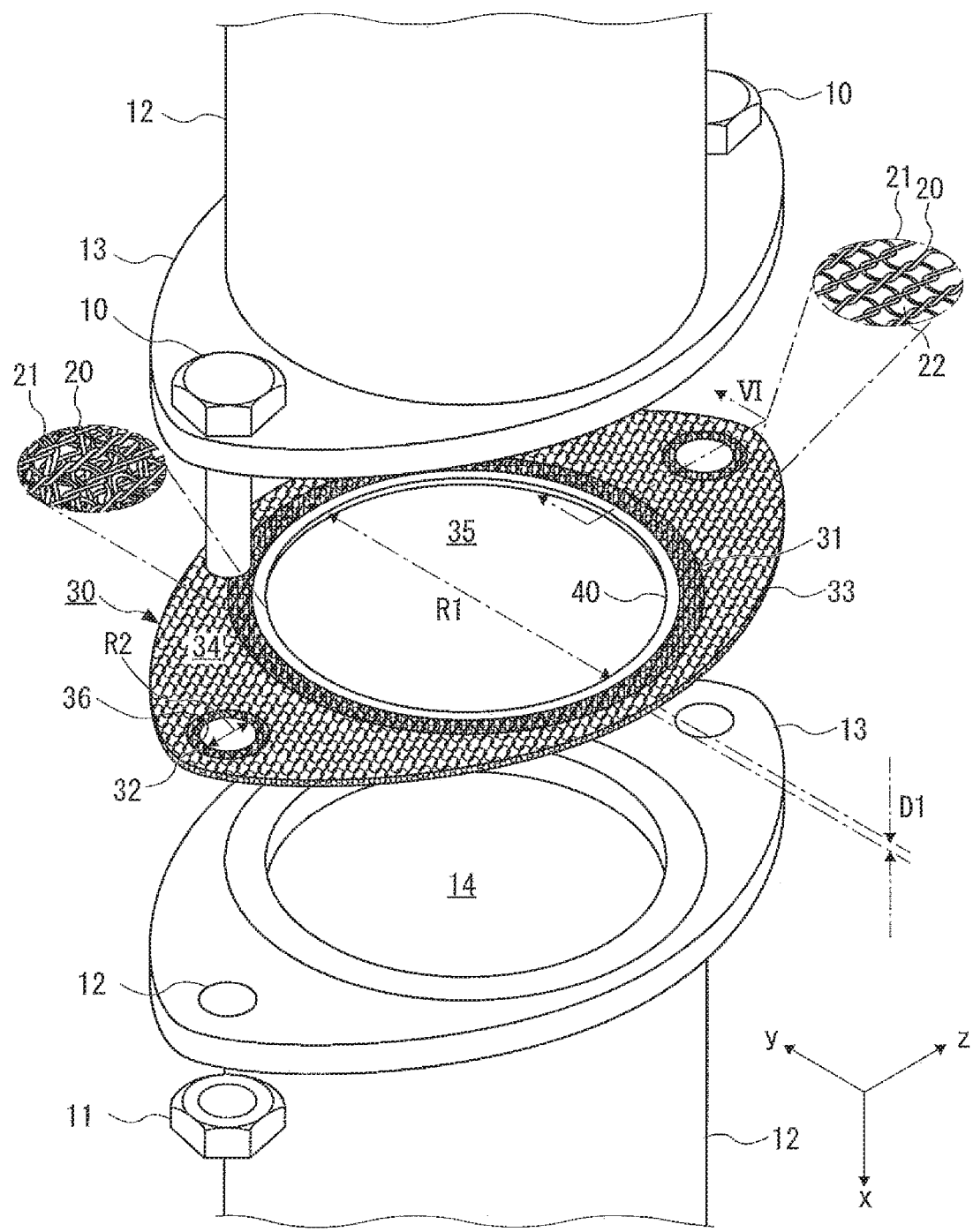
FIG. 5 is a perspective view showing a second embodiment of the gasket as an example according to the present invention.
Figure 6:
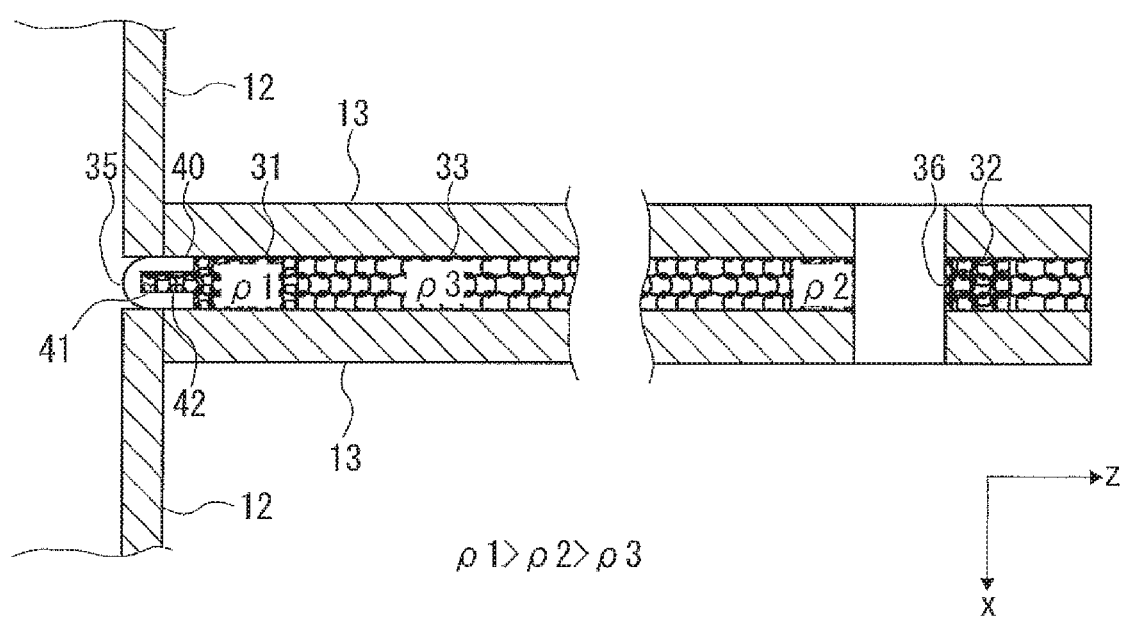
FIG. 6 is a cross-sectional view taken along an arrow VI in FIG. 5.

As shown in FIG. 5 and FIG. 6 as an example, in the gasket 30 of a second embodiment, in contrast with the first embodiment, a grommet 40 is fixed on an inner circumference side of the first annular portion 31 instead of the filling material 37. The grommet 40 is made of a metal, and forms an annular shape viewed from the x direction. The grommet 40 and the first annular portion 31 are integrated by fitting a fitting portion 42 formed on an inner circumference of the first annular portion 31 into a fitting groove 41 formed on an outer circumference of the grommet 40.

Thus, instead of the filling material 37, the grommet 40 covering the sealing object hole 35 of the first annular portion 31 is provided so as to maintain the surface pressure of the circumferential edge of the sealing object hole 35 high by the grommet 40, and to improve the seal performance. Incidentally, in a case wherein a temperature of the fluid passing through the sealing object hole 35 is low, the grommet 40 can be made of rubber, thermoplastic elastomer, and the like as well.

Figure 7A:
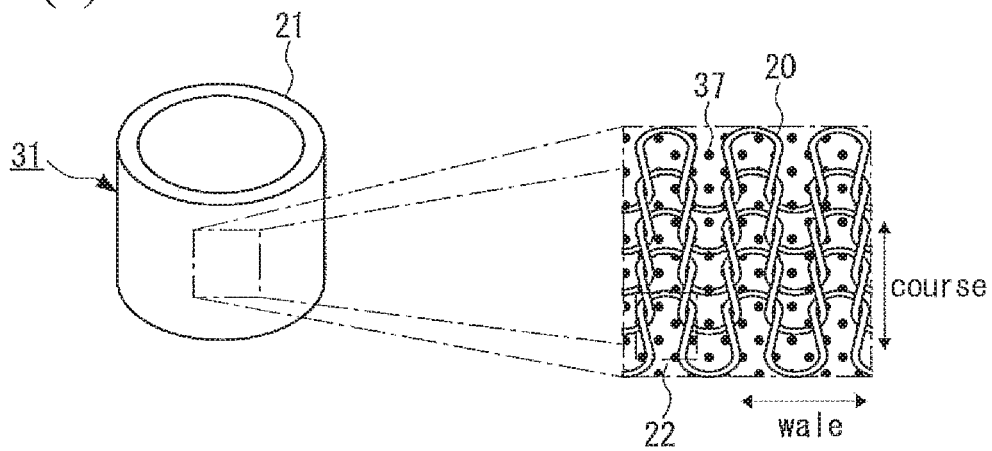
FIGS. 7(a), 7(b), and 7(c) are structural views showing metal wire weave of a third embodiment of the gasket as an example according to the present invention.
Figure 7B:
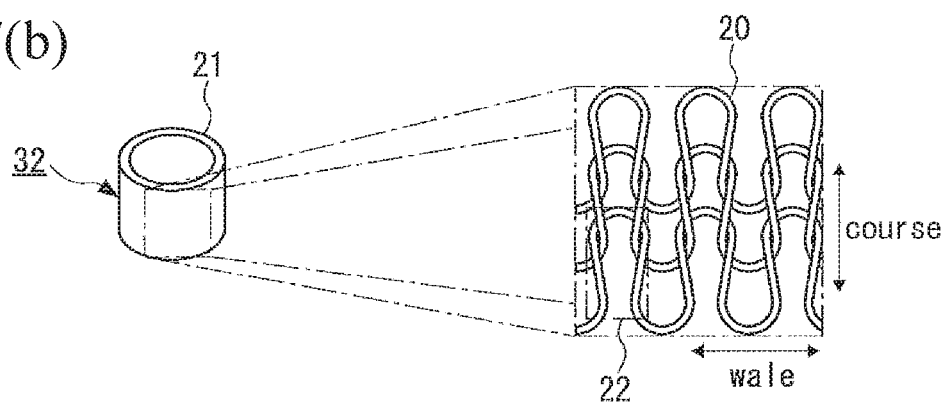
Figure 7C:
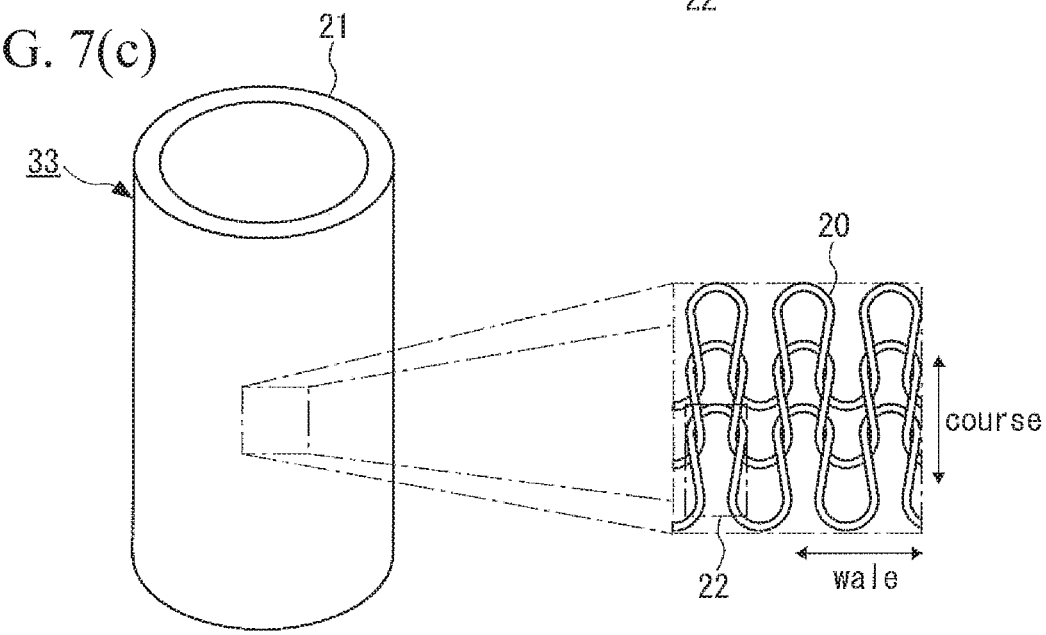

As shown in FIGS. 7(a), 7(b), and 7(c) as an example, in the gasket 30 of a third embodiment, in contrast with the first embodiment, the stitch 22 of the metal wire weave 21 of the first annular portion 31 is weaved smaller than the stitches 22 of the metal wire weave 21 of the second annular portion 32 and the main member portion 33.

Figure 8A:
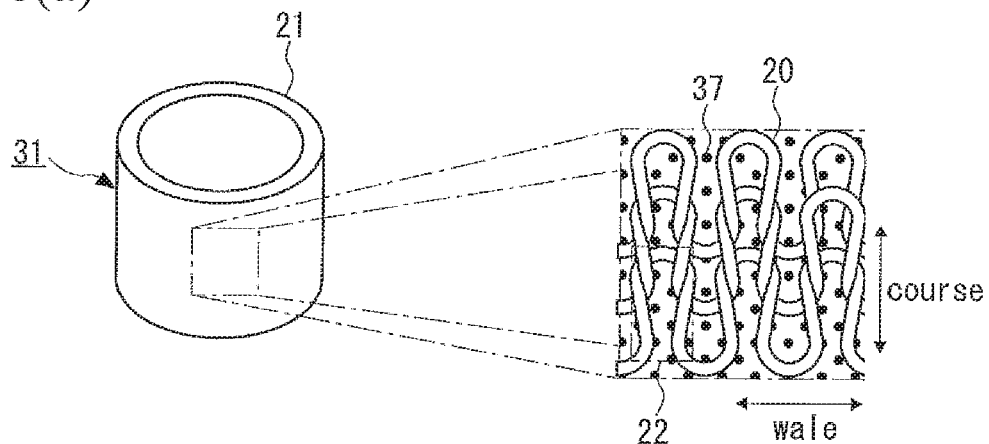
FIGS. 8(a), 8(b), and 8(c) are structural views showing metal wire weave of a fourth embodiment of the gasket as an example according to the present invention.
Figure 8B:
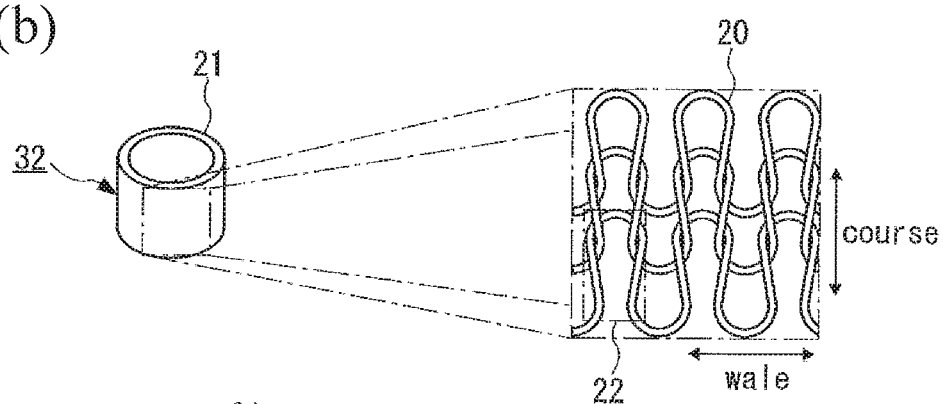
Figure 8C:
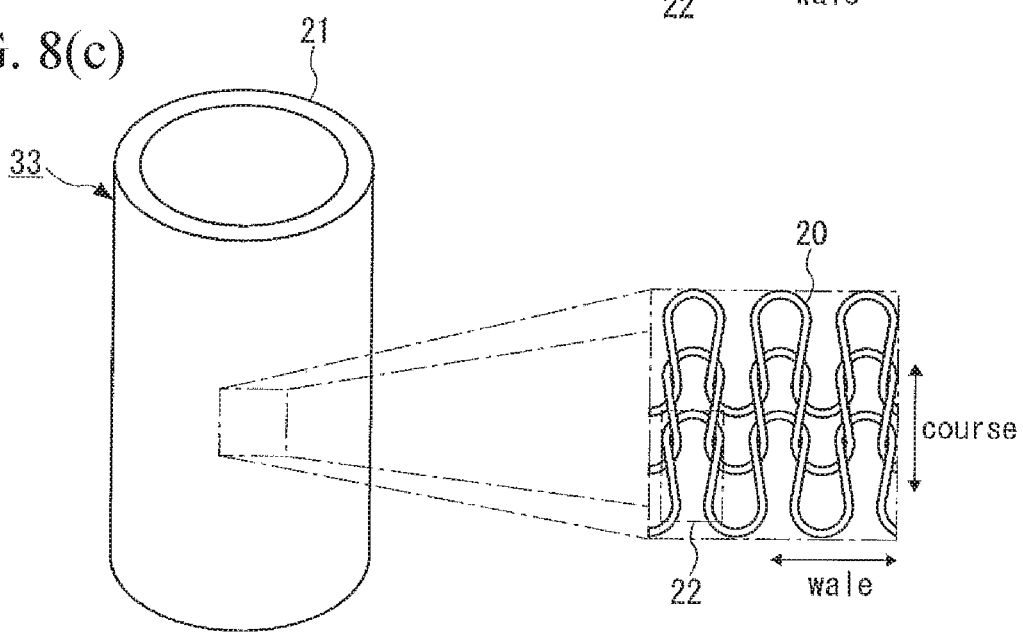

As shown in FIGS. 8(a), 8(b), and 8(c) as an example, in the gasket 30 of a fourth embodiment, a wire diameter of the metal wire 20 of the metal wire weave 21 of the first annular portion 31 is larger than wire diameters of the metal wire 20 of the metal wire weaves 21 of the second annular portion 32 and the main member portion 33.

Figure 9A:
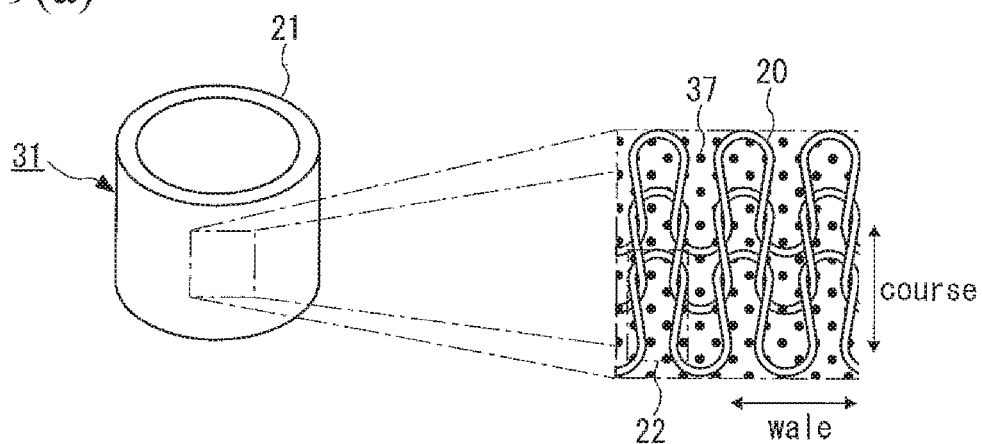
FIGS. 9(a), 9(b), and 9(c) are structural views showing metal wire weave of a fifth embodiment of the gasket as an example according to the present invention.
Figure 9B:
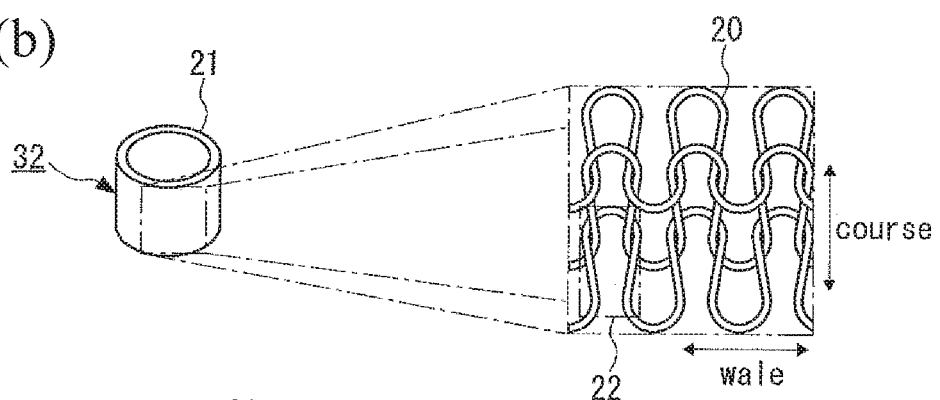
Figure 9C:
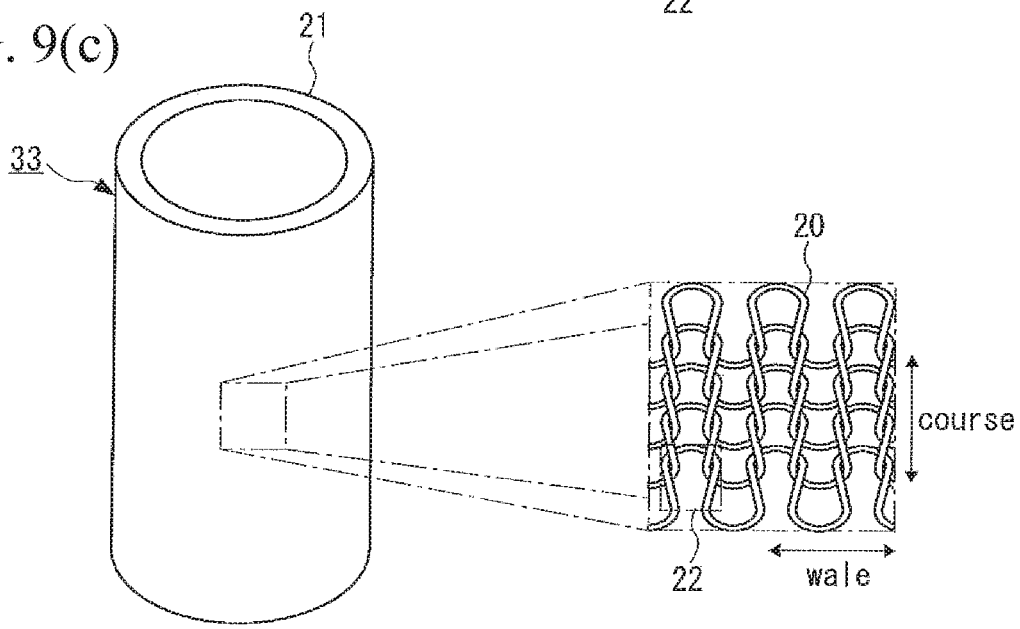

As shown in FIGS. 9(a), 9(b), and 9(c) as an example, in the gasket 30 of a fifth embodiment, the metal wire weaves 21 of the first annular portion 31 and the main member portion 33 are weaved by the plain stitch, and the metal wire weave 21 of the second annular portion 32 is weaved by the rib stitch.

Furthermore, the metal wire weave 21 of the first annular portion 31 may be weaved by two threads of the metal wires 20, and the metal wire weave 21 of the second annular portion 32 and the main member portion 33 may be weaved by one thread of the metal wire 20. Also, the metal wire weave 21 of the first annular portion 31 and the metal wire weaves 21 of the second annular portion 32 and the main member portion 33 may be weaved by the different metal wire 20 respectively.

As mentioned above, the compressive stress in the x direction of the first annular portion 31, the second annular portion 32, and the main member portion 33 in the gasket 30 when the flanges 13 are fastened, can differ by a material, the wire diameter, and the number of the metal wire 20. Also, the compressive stress can differ by the number of the courses (horizontal rows) and the number of the wales (vertical rows) of the stitches 22 before the metal wire weave 21 is compressed in the x direction, sizes of the stitches 22, the braiding method, and the like. Additionally, the compressive stress can differ by a direction of the metal wire weave 21, a lamination number, and the like. Incidentally, depending on the material of the metal wire 20 or the weaving method of the metal wire weave 21, there is a case wherein the compressive stress in the x direction becomes small even if the volume density of the metal wire 20 is large.

Thus, the gasket 30 mentioned above can be formed in an arbitrary shape using an easy processing ability and a flexibility of the metal wire weave 21, and the compressive stress in the x direction of an arbitrary portion can be changed. Thereby, the gasket 30 can be applied to various gaskets.

The gasket 30 mentioned above is not limited to a gasket for a flange, and can be applied to, for example, a gasket including a plurality of sealing object holes 35 such as a gasket for an exhaust manifold, a cylinder head gasket, and the like. Incidentally, in the cylinder head gasket, an annular portion corresponding to a water hole or an oil hole other than a cylinder bore may be manufactured.

Regarding the gasket 30 mentioned above, the volume density of the metal wire 20 may be increased in the order of the volume density p1, the volume density p2, and the volume density p3. A repulsive force in the x direction of the first annular portion 31, the second annular portion 32, and the main member portion 33 can be changed variously according to the shape of the gasket and a use purpose.

The disclosure of Japanese Patent Application No. 2017-011041, filed on Jan. 25, 2017, is incorporated in the application.

While the invention has been explained with reference to the specific embodiments of the invention, the explanation is illustrative and the invention is limited only by the appended claims.

EXPLANATION OF SYMBOLS 20 a metal wire
21 a metal wire weave
30 a gasket
31 a first annular portion
32 a second annular portion
33 a main member portion 34 plate faces
35 a sealing object hole
36 a fastener insertion hole

What is claimed is:

1. A gasket formed of a metal wire weave having at least one through hole, comprising:
    an annular portion formed of a first compressed tubular metal wire weave in an annular shape, and including the through hole; and
    a main member portion formed of a flattened tubular metal wire weave in a flat shape, and including an enlarged hole enlarging a part of the flattened tubular metal wire weave, the main member portion being formed separately from the annular portion and contacting an outer circumferential edge of the annular portion so that a metal wire forming the annular portion and a metal wire forming the main member portion are respectively interlaced,
    wherein a compressive stress in a thickness direction of the first compressed tubular metal wire weave forming the annular portion differs from a compressive stress in a thickness direction of the flattened tubular metal wire weave forming the main member portion, and
    the first compressed tubular metal wire weave includes courses extending in a length direction thereof, and wales extending in an annular direction thereof so that the courses are compressed along the axial direction, and the flattened tubular metal wire weave includes courses extending in a length direction thereof, and wales extending in an annular direction thereof and is compressed in a diametric direction thereof.

2. A gasket according to claim 1, further comprising a sealing object hole as the through hole, and a fastener insertion hole,
    wherein a compressive stress in a thickness direction of the first compressed tubular metal wire weave forming a first annular portion including the sealing object hole differs from a compressive stress in a thickness direction of a second compressed tubular metal wire weave forming a second annular portion including the fastener insertion hole.

3. A gasket according to claim 2, wherein the first compressed tubular metal wire weave forming the first annular portion includes a filling material closing stitches thereof.

4. A gasket according to claim 2, wherein a grommet is fixed on an inner circumference side of the first annular portion.

5. A gasket according to claim 1, further comprising another annular portion formed of a second compressed tubular metal wire weave in an annular shape, and including a fastener insertion hole, the another annular portion being disposed in another enlarged hole enlarging another part of the flattened tubular metal wire weave, the main member portion contacting an outer circumferential edge of the another annular portion so that a metal wire forming the another annular portion and the metal wire forming the main member portion are respectively interlaced.

6. A gasket according to claim 5, wherein a volume density of the second compressed tubular metal wire weave is less than a volume density of the first compressed tubular metal wire weave and greater than a volume density of the flattened tubular metal wire weave.

7. A gasket according to claim 1, wherein the first compressed tubular metal wire weave has the annular shape so that an annular metal weave is compressed in an axial direction, and the flattened tubular metal wire weave has a flat shape so that an annular metal weave is compressed in a diametric direction thereof.

* * * * *